US012673283B2

(12) United States Patent
Arakawa

(10) Patent No.: US 12,673,283 B2
(45) Date of Patent: Jul. 7, 2026

(54) GAS-LIQUID SEPARATOR

(71) Applicant: AISIN CORPORATION, Kariya (JP)

(72) Inventor: Koichi Arakawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 446 days.

(21) Appl. No.: 18/248,597

(22) PCT Filed: Sep. 29, 2021

(86) PCT No.: PCT/JP2021/035919
    § 371 (c)(1),
    (2) Date: Apr. 11, 2023

(87) PCT Pub. No.: WO2022/102269
    PCT Pub. Date: May 19, 2022

(65) Prior Publication Data
    US 2023/0381700 A1     Nov. 30, 2023

(30) Foreign Application Priority Data

Nov. 10, 2020     (JP) ................................. 2020-187150

(51) Int. Cl.
    B01D 45/08         (2006.01)
    B01D 29/05         (2006.01)
    (Continued)

(52) U.S. Cl.
    CPC ............. B01D 45/08 (2013.01); B01D 29/05 (2013.01); B01D 29/52 (2013.01); H01M 8/04164 (2013.01)

(58) Field of Classification Search
    CPC .. B01D 35/0273; B01D 36/006; B01D 45/08; B01D 45/10; B01D 36/001; F16K 49/00;
    (Continued)

(56) References Cited

U.S. PATENT DOCUMENTS

| | | | | |
|---|---|---|---|---|
| 2014/0345464 A1* | 11/2014 | Behruzi | ............. | B01D 19/0047 |
| | | | | 96/108 |
| 2019/0252701 A1 | 8/2019 | Okamura et al. | | |

(Continued)

FOREIGN PATENT DOCUMENTS

| | | |
|---|---|---|
| JP | 2008-53158 A | 3/2008 |
| JP | 2019-93359 A | 6/2019 |

(Continued)

OTHER PUBLICATIONS

International Search Report issued Nov. 22, 2021 in PCT/JP2021/035919 filed Sep. 29, 2021, 2 pages.

*Primary Examiner* — Dung H Bui
(74) *Attorney, Agent, or Firm* — Oblon, McClelland, Maier & Neustadt, L.L.P.

(57) ABSTRACT

A gas-liquid separator is structured that can satisfactorily drain water even when used in a low-temperature environment and that prevents water from being stored near an electromagnetic on-off valve after a fuel cell stops generating electricity. The gas-liquid separator includes: a gas-liquid separation portion that separates water from water-containing gas in an upper part of a housing; an annular first water storage portion that receives and stores the water in a lower part of the housing; a second water storage portion located below the first water storage portion; and a valve mechanism that opens and closes a drain channel. The gas-liquid separator further includes: a tubular wall that is located inside the first water storage portion and guides the water having overflowed the tubular wall into the second water storage portion; and a lid-like member covering an upper side of the tubular wall.

4 Claims, 7 Drawing Sheets

(51) Int. Cl.
    *B01D 29/52*       (2006.01)
    *H01M 8/04119*    (2016.01)

(58) Field of Classification Search
    CPC .. F16K 49/002; Y02T 90/40; H01M 8/04164;
           H01M 8/04776; H01M 8/04619; Y02E
                               60/50
    See application file for complete search history.

(56)                      References Cited

U.S. PATENT DOCUMENTS

| | | | |
|---|---|---|---|
| 2019/0282942 A1 | 9/2019 | Mishima et al. | |
| 2020/0044269 A1 | 2/2020 | Yamanaka et al. | |
| 2020/0324232 A1 | 10/2020 | Mishima et al. | |
| 2021/0098803 A1* | 4/2021 | Kajio | B01D 45/08 |

FOREIGN PATENT DOCUMENTS

| | | | |
|---|---|---|---|
| JP | 2019-139935 A | 8/2019 | |
| JP | 2019-155334 A | 9/2019 | |
| JP | 2020-21586 A | 2/2020 | |
| JP | 2020-177729 A | 10/2020 | |

* cited by examiner

GAS-LIQUID SEPARATOR

TECHNICAL FIELD

The present disclosure relates to gas-liquid separators.

BACKGROUND ART

Gas-liquid separators that separate water from gas are described in Patent Document 1 and Patent Document 2.

The gas-liquid separator described in Patent Document 1 is structured to separate water from anode gas in an upper part of a housing to recover the water in a water storage portion in a lower part of the housing, and drain the water stored in the water storage portion by opening a drain channel communicating with the water storage portion by an electromagnetic on-off valve.

The gas-liquid separator described in Patent Document 2 includes a valve device in its lower part, and is structured to drain water in the lower part of the gas-liquid separator by opening the valve device. In particular, a heating device is disposed in a fluid inlet portion that introduces a fluid into a valve body. The valve device is structured so that, when the valve device is frozen, the valve device can be thawed by heat from the heating device.

RELATED ART DOCUMENTS

Patent Documents

Patent Document 1: Japanese Unexamined Patent Application Publication No. 2019-155334 (JP 2019-155334 A)
Patent Document 2: Japanese Unexamined Patent Application Publication No. 2019-139935 (JP 2019-139935 A)

BRIEF SUMMARY

Problem to be Solved

There are cases where a vehicle with the gas-liquid separator that separates water from cathode gas of a fuel cell mounted on the vehicle as described in Patent Document 1 is parked outdoors where the temperature drops below freezing. In such a case, if water remains at the bottom of the gas-liquid separator due to, for example, water droplets falling after the fuel cell stops generating electricity, the water may freeze in the portion where the electromagnetic on-off valve is located.

In such a case, it may be difficult to drain newly generated water immediately after the fuel cell starts generating electricity.

One solution to this disadvantage is to provide a heating device in the gas-liquid separator as in Patent Document 2 so that water can be drained by thawing the valve device by the heat from the heating device. However, the gas-liquid separator with the heating device increases manufacturing cost, and reduces the cruising range of the vehicle as such a gas-liquid separator consumes generated energy. There is also a disadvantage that the water cannot be drained until the valve device is thawed.

For these reasons, there is a demand for a gas-liquid separator that can reliably drain water in its bottom part and prevents water from being stored near an electromagnetic on-off valve after a fuel cell stops generating electricity.

Means for Solving the Problem

A characteristic structure of a gas-liquid separator according to the present disclosure is that the gas-liquid separator includes: a housing to which water-containing gas is supplied; a gas-liquid separation portion that is located in an upper part of the housing and that separates water from the water-containing gas; a first water storage portion that is located in a lower part of the housing and that receives and stores the water separated by the gas-liquid separation portion, the first water storage portion having an annular shape as viewed in plan; a second water storage portion that is located below the first water storage portion in a bottom part of the housing, and to which the water from the first water storage portion is supplied; a valve mechanism that allows the water stored in the second water storage portion to be drained and to stop being drained by opening and closing a drain channel communicating with a bottom part of the second water storage portion; a tubular wall that is located inside the first water storage portion and that stores the water in the first water storage portion until the water overflows, and guides the overflowed water into the second water storage portion; and a lid-like member that covers an upper side of the tubular wall.

According to this characteristic structure, the water separated from the water-containing gas in the gas-liquid separation portion is first received by and stored in the first water storage portion. As the amount of water stored in the first water storage portion increases, the water overflows an upper end of the tubular wall and is supplied to the second water storage portion. The water stored in the second water storage portion can be drained to the outside by opening the valve mechanism. In this gas-liquid separator, since the lid-like member covers the upper side of the tubular wall, a lower part of the first water storage portion and an upper part of the second water storage portion are connected by a flow channel in which entry and exit of external gas are restricted. Accordingly, when the water in the second water storage portion is drained by opening the valve mechanism, the pressure in the second water storage portion drops, so that the pressure in the first water storage portion rises relative to the pressure in the second water storage portion. This pressure difference causes the water in the first water storage portion to overflow the upper end of the tubular wall and flow into the second water storage portion, so that the water level in the first water storage portion can be lowered. The water having flowed into the second water storage portion can be drained to the outside through the valve mechanism.

For example, it is herein assumed that a vehicle is equipped with a fuel cell and the gas-liquid separator. Since the vehicle is equipped with the gas-liquid separator having the above characteristic structure, the water surface in the first water storage portion can be significantly lowered by merely opening the valve mechanism and draining the water in the second water storage portion when the vehicle is parked in a cold region. Accordingly, even if a small amount of water that is present inside the fuel cell flows into the housing after the water in the second water storage portion is drained, or even if water droplets on the inner surface of the housing fall, this water will be received by the first water storage portion, and will not flow into the second water storage portion. A disadvantage that an area from the drain channel to the valve mechanism is frozen can thus be eliminated. The gas-liquid separator is thus structured that can satisfactorily drain water in the second water storage portion and that prevents water from being stored in the second storage portion after the fuel cell stops generating electricity.

In addition to the above structure, the lid-like member may include a vertical wall portion separated from the tubular wall.

According to this structure, when the level of the water stored in the first water storage portion is higher than a lower end of the vertical wall portion, the water is present in clearance between the tubular wall and the vertical wall portion. The lower part of the first water storage portion and the upper part of the second water storage portion can thus be connected by a flow channel in which entry and exit of external gas are restricted.

In addition to the above structure, a plurality of rib bodies that causes water to flow from the first water storage portion to the second water storage portion between the tubular wall and the vertical wall portion may be located on either or both of an outer wall surface of the tubular wall and an inner wall surface of the vertical wall portion.

By forming the plurality of rib bodies, water can be caused to flow into the clearance between the outer wall surface of the tubular wall and the inner wall surface of the vertical wall portion of the lid-like member. This makes it easier for the water in the first water storage portion to flow into the second water storage portion.

In addition to the above structure, the vertical wall portion of the lid-like member may be fitted outside the tubular wall, and the vertical wall portion may have a slit extending from a lower end of the vertical wall portion to a position above the upper end of the tubular wall as viewed from side with the vertical wall portion fitted outside the tubular wall.

According to this structure, even when the water in the first water storage portion freezes in a situation where the surface of the water stored in the first water storage portion is located near the upper end of the tubular wall, an upper end portion of the slit is located above the frozen surface. Therefore, even in a situation where the water-containing gas starts to be supplied to the gas-liquid separation portion and the water separated from the water-containing gas is received by the first water storage portion, this water flows on the frozen surface, and the water having passed through the slit overflows the upper end portion of the tubular wall and can thus be supplied into the second water storage portion.

In addition to the above structure, a drain guide rib that guides the water having overflowed the upper end of the tubular wall into the second water storage portion may be located on an inner periphery of the tubular wall.

According to this structure, the water flowing from the upper end of the tubular wall along an inner wall surface of the tubular wall can be guided by the drain guide rib to smoothly flow into the second water storage portion.

In addition to the above structure, the lid-like member may include, between the gas-liquid separation portion and the first water storage portion, a filter that removes dust contained in the water separated by the gas-liquid separation portion.

According to this structure, even if dust is contained in the water inside the housing, the filter can remove the dust, so that a disadvantage such as a proper operation of the valve mechanism being hindered by the dust contained in the water can be avoided.

MODES FOR CARRYING OUT THE DISCLOSURE

Figure 1:
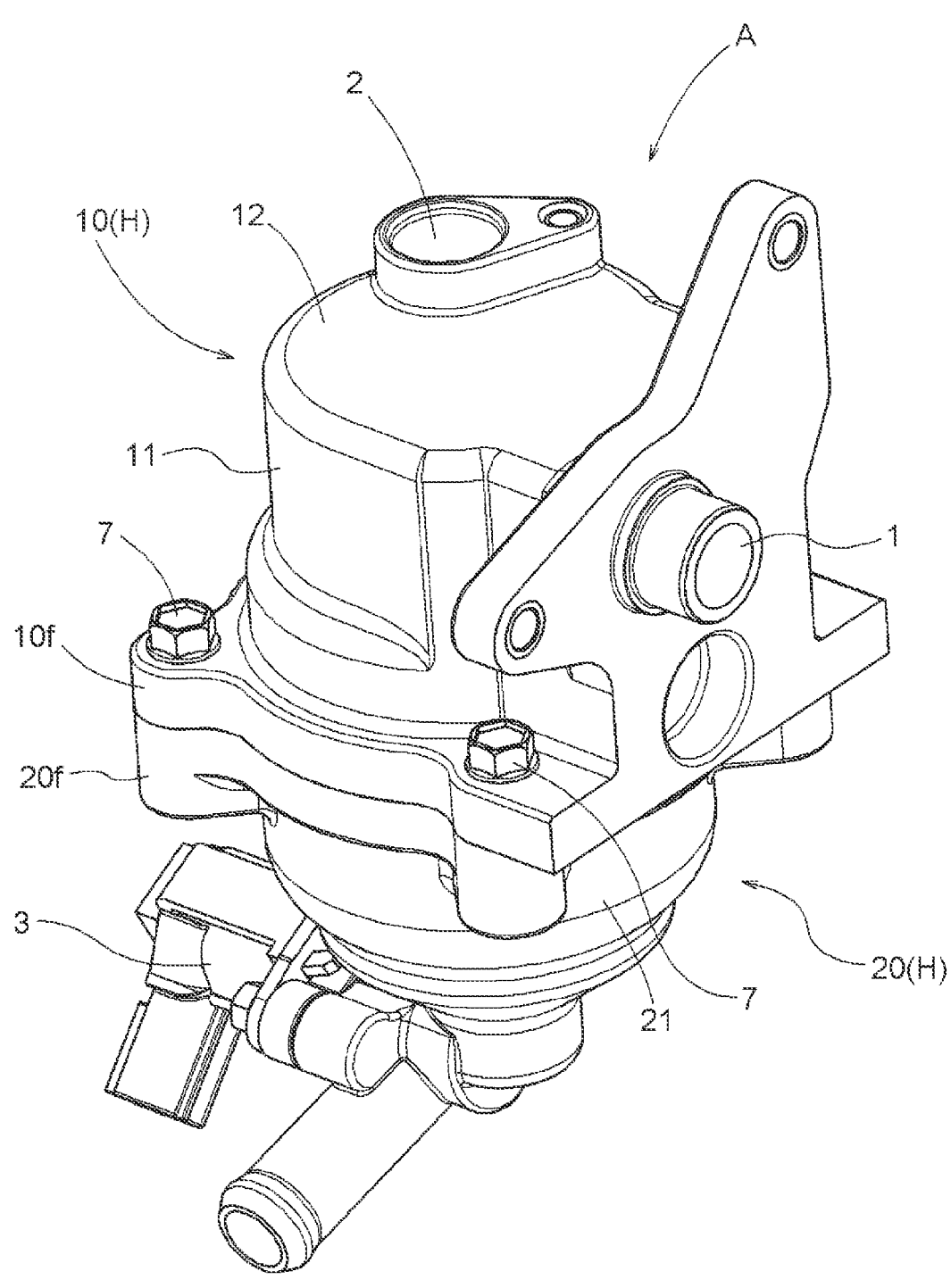
FIG. 1 is a perspective view of a gas-liquid separator.
Figure 2:
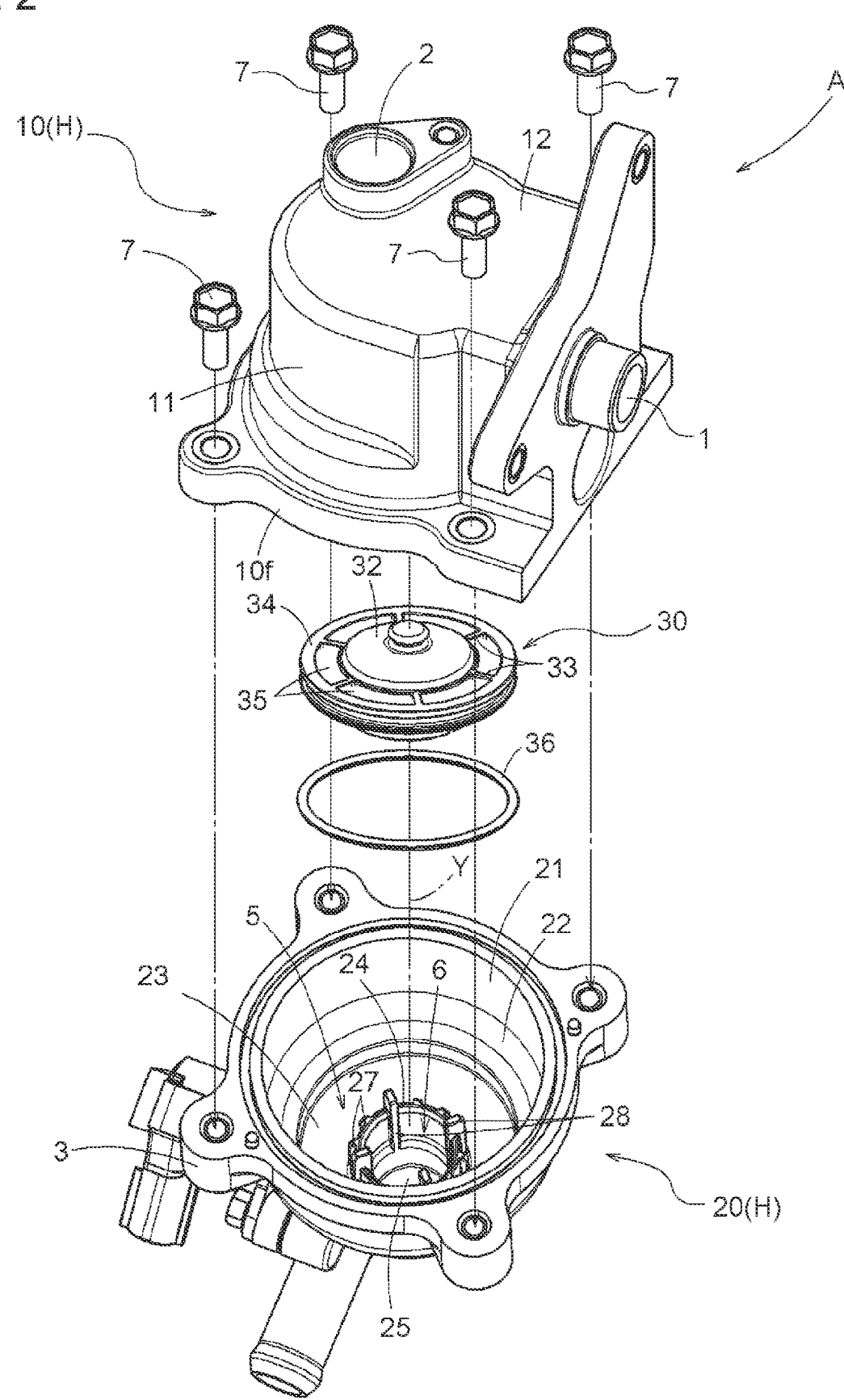
FIG. 2 is an exploded perspective view of the gas-liquid separator.

An embodiment of the present disclosure will be described below with reference to the drawings.

Basic Configuration

FIGS. 1 to 5 show a gas-liquid separator A that separates water contained in anode off-gas (example of the water-containing gas) discharged from the anode of a fuel cell mounted on a fuel cell vehicle (FCV). This gas-liquid separator A includes an inlet portion 1 and an outlet portion 2 at upper positions of a housing H, and includes an electromagnetic on-off valve 3 (example of the valve mechanism) at a bottom position of the housing H. A gas-liquid separation portion 4 is located in the upper part of the internal space of the housing H, and a first water storage portion 5 and a second water storage portion 6 are located in the lower part of the internal space of the housing H.

The fuel cell generates electricity as fuel gas containing hydrogen gas is supplied to the anode through anode gas flow channels and oxidant gas (air containing oxygen) is supplied to the cathode through cathode gas flow channels. The anode off-gas discharged from the anode contains unreacted hydrogen gas and water. For this reason, the gas-liquid separator A is used to separate and drain the water contained in the anode off-gas to recover the hydrogen gas contained in the anode gas, and return the recovered hydrogen gas to the anode gas flow channels of the fuel cell.

Housing

As shown in FIGS. 1 to 5, the housing H has an upper housing 10 and a lower housing 20, and the upper housing 10 and the lower housing 20 are put together by placing an upper flange 10f of the upper housing 10 on top of a lower flange 20f of the lower housing 20 and fastening them together with a plurality of fastening bolts 7.

The tubular inlet portion 1 is formed in such an attitude that the inlet portion 1 protrudes laterally from a tubular upper side wall 11 of the upper housing 10, and the outlet portion 2 is formed in such an attitude that the outlet portion 2 protrudes upward from a flat upper end wall 12 at the upper end of the upper housing 10. The upper housing 10 and the lower housing 20 are herein made of resin, but may be made of metal such as aluminum.

The gas-liquid separation portion 4 containing a plurality of plate-like collision walls 13 for separating water contained in the anode off-gas as the anode off-gas supplied from the inlet portion 1 comes into contact with the collision walls 13 is formed in the internal space of the upper housing 10.

This gas-liquid separation portion 4 functions to separate water contained in the gas and cause the water to drop downward by successively bringing the anode off-gas introduced from the inlet portion 1 into contact with the plurality of collision walls 13. The resultant dry gas after the separation of the water is discharged upward from the outlet portion 2.

Figure 3:
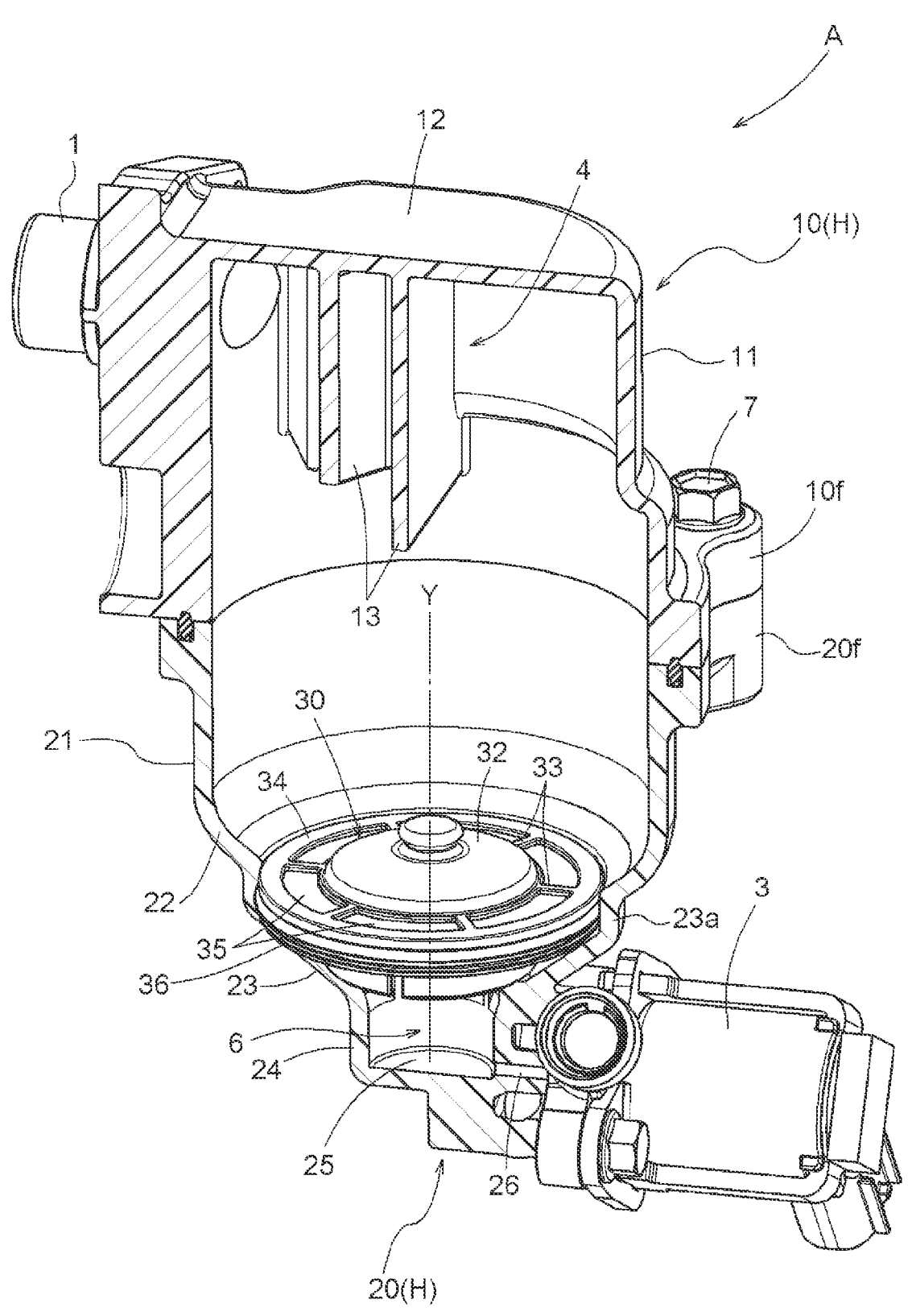
FIG. 3 is a partially sectional perspective view of the gas-liquid separator, shown partially cutaway.
Figure 4:
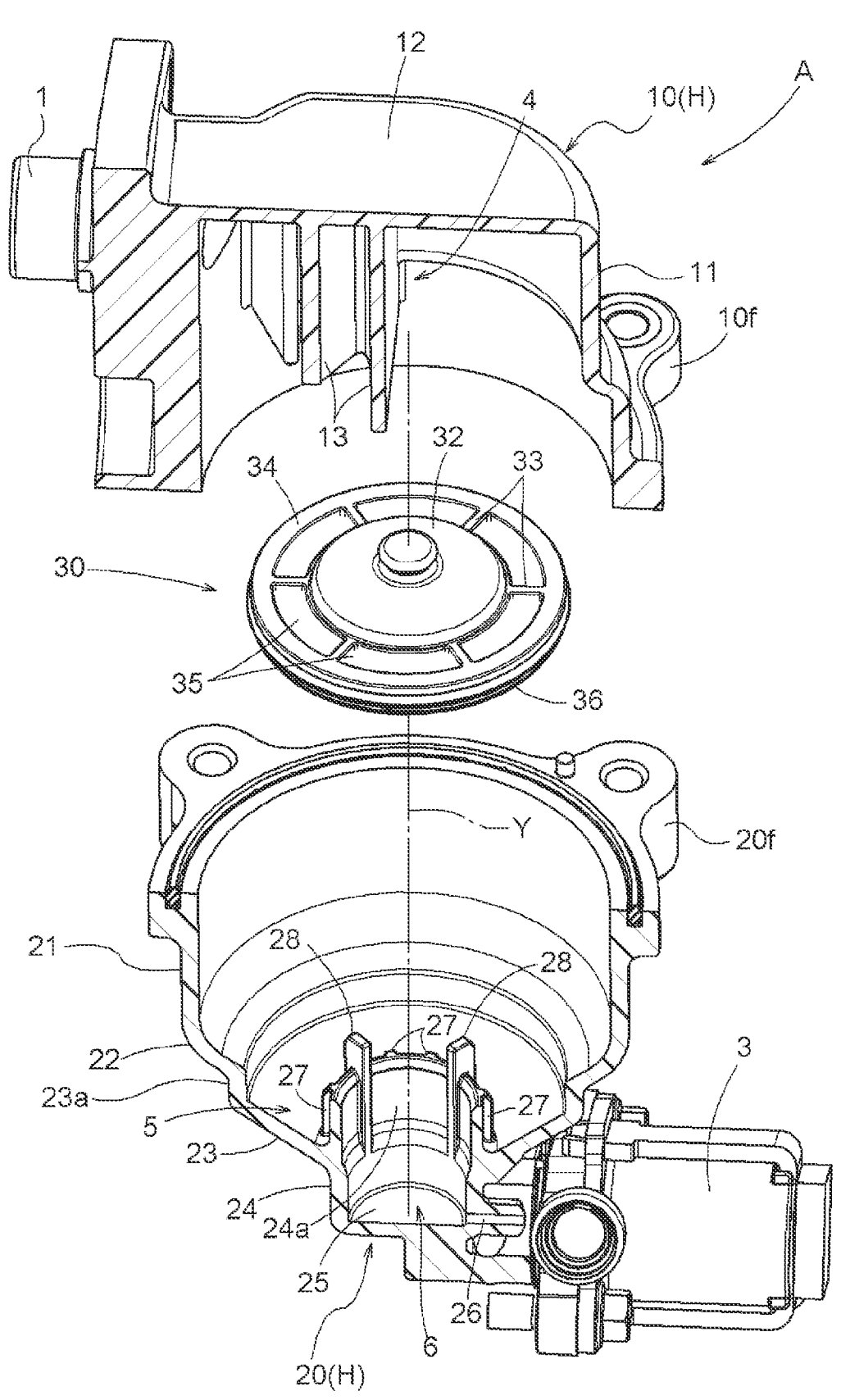
FIG. 4 is a partially sectional exploded perspective view of the gas-liquid separator as viewed from above, shown partially cutaway.
Figure 5:
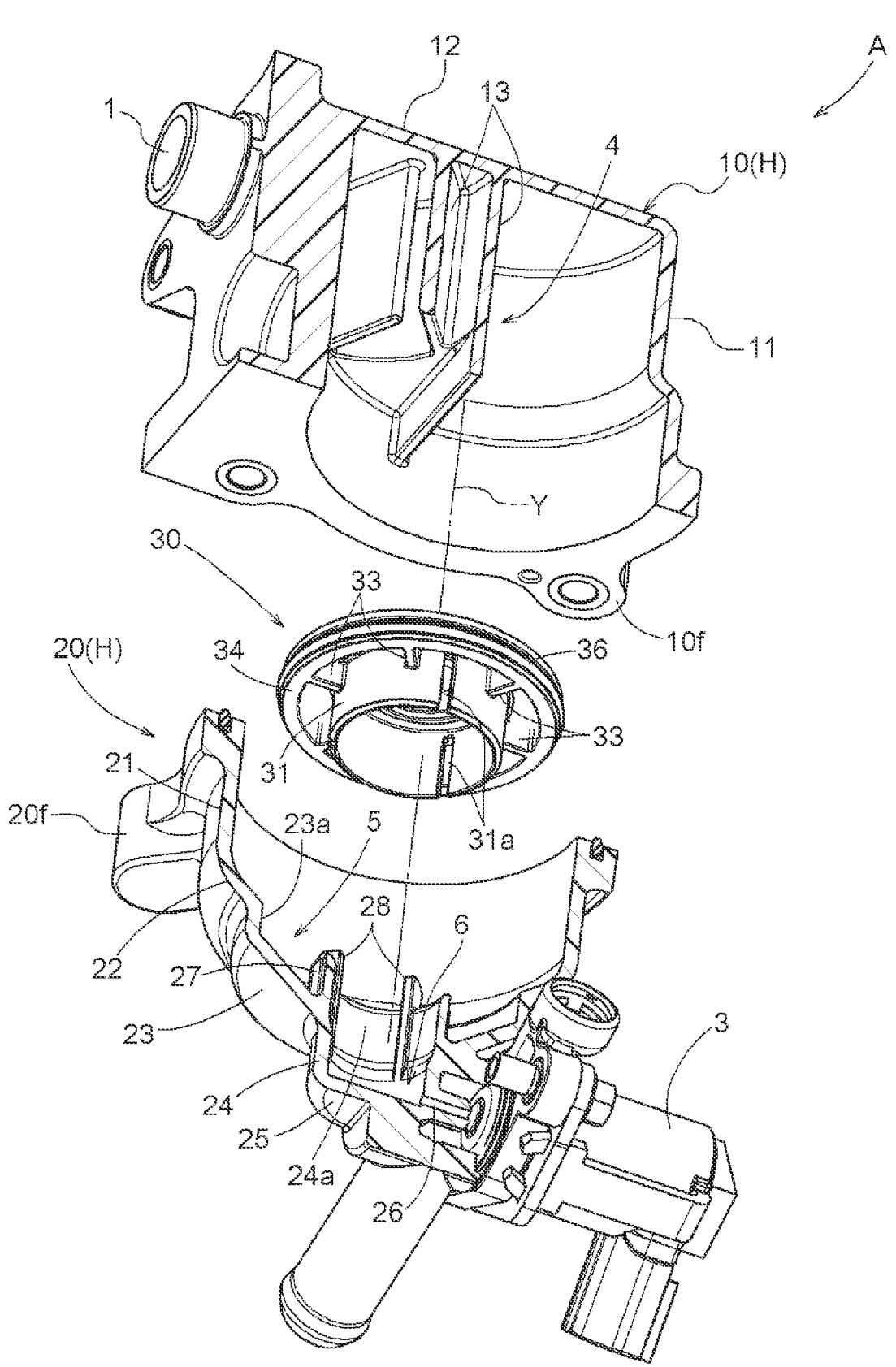
FIG. 5 is a partially sectional exploded perspective view of the gas-liquid separator as viewed from below, shown partially cutaway.

As shown in FIGS. 3 to 5, the lower housing 20 is a housing in which the following walls are formed integrally: a lower side wall 21 having a cylindrical shape about the vertical axis Y; a guide wall 22 that is continuous with the lower side of the lower side wall 21 and has such a shape that gradually tapers toward its lower side and that guides water; a tilted wall 23 that is continuous with the lower side of the guide wall 22 and has such a funnel shape that gradually tapers toward its lower side; a tubular wall 24 that is continuous with the lower side of the tilted wall 23 and has a cylindrical shape about the vertical axis Y; and a bottom wall 25 that closes the lower end of the tubular wall 24.

At an upper end position of the tilted wall 23, a vertical intermediate wall 23*a* is formed about the vertical axis Y in a boundary portion that is continuous with the guide wall 22.

Figure 6:
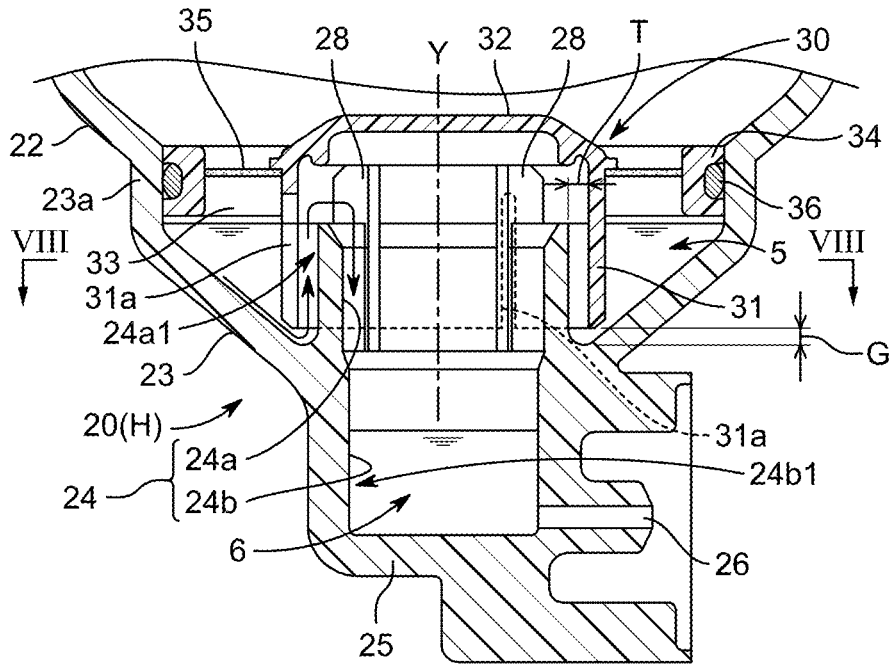
FIG. 6 is an enlarged sectional view showing a first water storage portion etc. with water overflowing.
Figure 7:
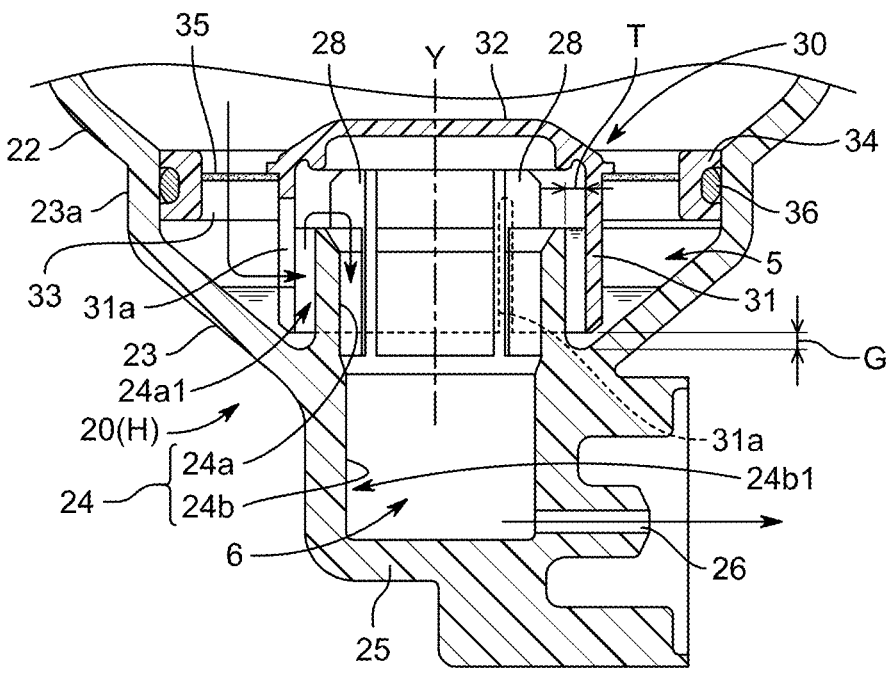
FIG. 7 is an enlarged sectional view showing the flow of water from the first water storage portion to a second water storage portion when an electromagnetic on-off valve is opened.

As shown in FIGS. 6 and 7, the tubular wall 24 is formed in a region extending upward and downward from a boundary portion with the tilted wall 23. An annular space between an outer side 24*a*1 of an upper region 24*a* of the tubular wall 24 that extends upward from the boundary portion with the tilted wall 23 and the inner sides of the tilted wall 23 and the intermediate wall 23*a* forms the first water storage portion 5. A cylindrical space surrounded by an inner side 24*b*1 of a lower region 24b of the tubular wall 24 and the bottom wall 25 forms the second water storage portion 6. The lower region 24*b* extends downward from the boundary portion with the tilted wall 23.

A drain channel 26 that communicates with a space in the bottom part of the second water storage portion 6 is formed in the lower housing 20. The electromagnetic on-off valve 3 is provided outside the lower end portion of the lower housing 20 so that water drainage can be controlled by opening and closing the outer end of the drain channel 26.

The drain channel 26 is formed with a small diameter like an orifice in order to reduce discharge of the anode off-gas containing unreacted hydrogen and drain a constant amount of water when the electromagnetic on-off valve 3 is opened and water in the second water storage portion 6 is drained.

In this gas-liquid separator A, the positional relationship between the first water storage portion 5 and the second water storage portion 6 is set so that water separated from the anode off-gas by the gas-liquid separation portion 4 is received and stored in the first water storage portion 5 of the lower housing 20 and, as shown in FIG. 6, the water stored in the first water storage portion 5 is then caused to overflow the upper end of the tubular wall 24 located inside the first water storage portion 5 and thus this water can be stored in the second water storage portion 6. In particular, this structure includes a lid-like member 30 that controls the amount of water that flows from the first water storage portion 5 into the second water storage portion 6.

Lid-Like Member

As shown in FIGS. 2 to 7, the lid-like member 30 is a member in which the following portions are formed integrally: a tubular vertical wall portion 31 that is disposed (fitted) at a position separated outward from the outer wall surface of the upper region 24*a* of the tubular wall 24 and located at such a position that the vertical wall portion 31 overlaps the upper region 24*a* as viewed from the side (as viewed in a direction perpendicular to the vertical axis Y) in this state; and a lid-like portion 32 that closes the upper end of the vertical wall portion 31. That is, the lid-like member 30 covers the upper side of the tubular wall 24. As described above, the gas-liquid separator A has such a structure that the vertical wall portion 31 of the lid-like member 30 covers the outside of the tubular wall 24 and the lid-like portion 32 closes the upper end of the vertical wall portion 31 of the lid-like member 30. Therefore, when the level of the water stored in the first water storage portion 5 is higher than the lower end of the vertical wall portion 31, the lower part of the first water storage portion 5 and the upper part of the second water storage portion 6 are connected by a flow channel in which entry and exit of external gas are restricted. As will be described later, a plurality of slits 31*a* is formed in the vertical wall portion 31. These slits 31*a* allow gas to flow to some extent.

The lid-like member 30 includes: a plurality of frames 33 extending radially outward from the outer surface of the upper end of the vertical wall portion 31 and the outer edge of the lid-like portion 32; a ring-shaped portion 34 connected to the extended ends of the plurality of frames 33; and a filter 35 disposed between the ring-shaped portion 34 and the lid-like portion 32.

The outer shape of the ring-shaped portion 34 is determined so that the ring-shaped portion 34 is fitted in the intermediate wall 23*a* at the position of the upper end of the tilted wall 23. The filter 35 functions to remove dust contained in water separated by the gas-liquid separation portion 4 and supplied from the gas-liquid separation portion 4. That is, the filter 35 is located between the gas-liquid separation portion 4 and the first water storage portion 5. An O-ring 36 is mounted around the ring-shaped portion 34 to seal the gap between the ring-shaped portion 34 and the inner periphery of the intermediate wall 23*a*.

As shown in FIGS. 6 and 7, the lower end of the ring-shaped portion 34 is supported by the upper end of the tilted wall 23, and the lower surface of the lid-like portion 32 contacts the upper ends of drain guide ribs 28 that will be described later. The lid-like member 30 is thus supported at a proper position in the vertical direction. The lower end of the vertical wall portion 31 is tilted with respect to the wall surface so as to be parallel to the tile of the tilted wall 23. Since the lid-like member 30 is thus supported at the proper position, clearance G is provided in the vertical direction between the lower end of the vertical wall portion 31 and the tilted wall 23. Clearance T is also provided in the radial direction between the outer wall surface of the upper region 24*a* of the tubular wall 24 and the inner wall surface of the vertical wall portion 31.

Figure 8:
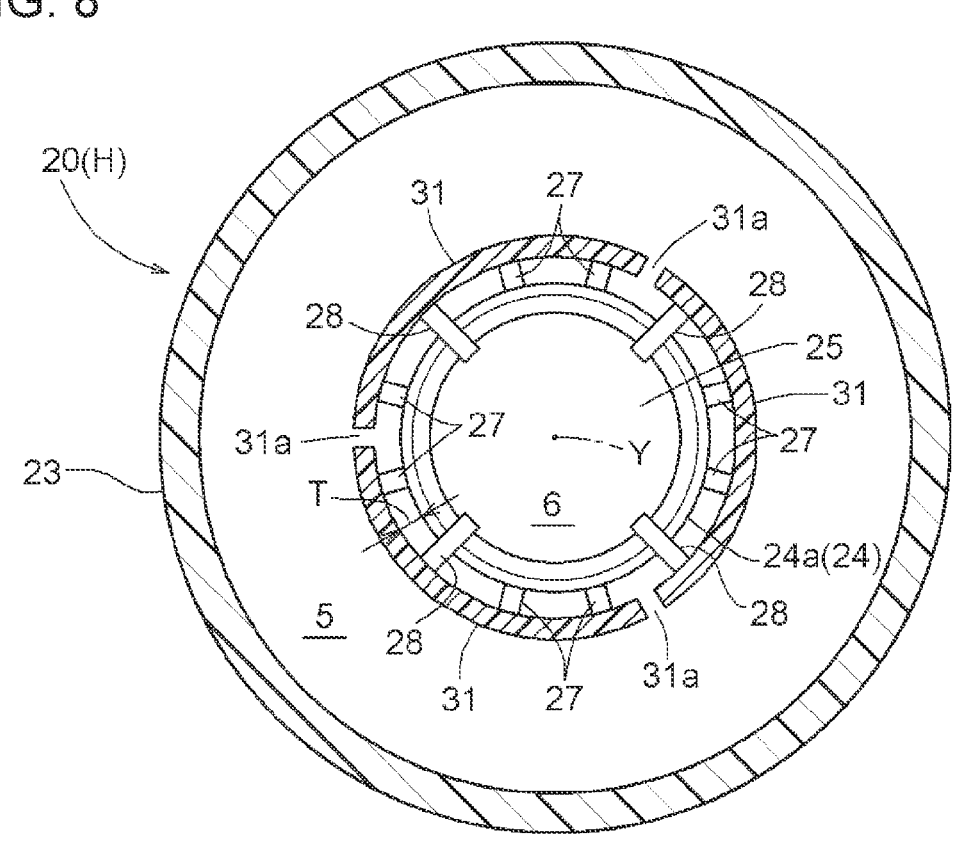
FIG. 8 is a sectional view taken along line VIII-VIII in FIG. 6.

As shown in FIG. 8, rib bodies 27 in a vertical attitude are formed on the outer periphery of the upper region 24*a* so that the clearance T between the outer wall surface of the upper region 24*a* of the tubular wall 24 and the inner wall surface of the vertical wall portion 31 becomes uniform along the entire circumference as viewed in plan. A plurality of drain guide ribs 28 is formed in a region from the inner periphery to outer periphery of the tubular wall 24 in order to assist the flow of water having overflowed the upper end of the tubular wall 24. The drain guide ribs 28 are formed so as to protrude upward from the upper end of the tubular wall 24 (upper end of the upper region 24*a*).

The plurality of rib bodies 27 thus restricts displacement (displacement in the radial direction) of the vertical wall portion 31 of the lid-like member 30 toward the tubular wall 24 when the lid-like member 30 is mounted inside the lower housing 20. The clearance T is thus kept uniform along the entire circumference, so that unevenness of the water flow in the clearance T can be eliminated and a satisfactory water flow can be maintained.

Since the drain guide ribs 28 are formed, water flowing on the inner surface of the tubular wall 24 is smoothly guided. As described above, the upper ends of the drain guide ribs 28 contact the lower surface of the lid-like portion 32 of the lid-like member 30. The position of the lid-like member 30 in the vertical direction is thus determined.

As shown in FIGS. 5 to 8, the vertical wall portion 31 has the slits 31a extending from the lower end of the vertical wall portion 31 to a position above the upper end of the tubular wall 24 (upper end of the upper region 24a) as viewed from the side. The cut ends of the upward extending slits 31a are located below the filter 35 (on the first water storage portion 5 side).

Water Flow from First Water Storage Portion to Second Water Storage Portion

In this gas-liquid separator A, a part of water separated from the anode off-gas by the gas-liquid separation portion 4 falls onto the upper surface of the lid-like member 30 and the upper surface of the filter 35, and another part of the water flows along the inner surface of the guide wall 22 and the tilted wall 23 of the lower housing 20. As a result, these parts of the water are filtered by the filter 35 and then stored in the first water storage portion 5.

When the fuel cell continues to generate electricity, the water continuously separated from the anode off-gas by the gas-liquid separation portion 4 is supplied to the first water storage portion 5. When the water surface in the first water storage portion 5 reaches above the upper end of the tubular wall 24, the water in the first water storage portion 5 overflows the upper end of the tubular wall 24 and is supplied to the second water storage portion 6, as shown in FIG. 6.

Since the amount of water separated from the anode off-gas by the gas-liquid separation portion 4 can be estimated from the amount of electricity generated by the fuel cell, the electromagnetic on-off valve 3 is controlled to open every time the estimated amount of water reaches a preset value. In this gas-liquid separator A, the pressure in the internal space of the housing H is higher than the pressure of outside air. Therefore, when the electromagnetic on-off valve 3 is opened, the water in the second water storage portion 6 is drained through the drain channel 26 due to the pressure difference between the second water storage portion 6 and the outside air.

Moreover, as the water in the second water storage portion 6 is drained, the pressure in the second water storage portion 6 becomes lower than the pressure in the first water storage portion 5. Accordingly, as shown in FIG. 7, water in the clearance T out of the water stored in the first water storage portion 5 overflows the upper end of the tubular wall 24 and is supplied to the second water storage portion 6 due to this pressure difference, and the water thus supplied to the second water storage portion 6 is also drained through the drain channel 26. At this time, the water level in the clearance T becomes higher than the water level between the vertical wall portion 31 and the tilted wall 23. Since the water flows in this manner, the water surface in the first water storage portion 5 is lowered to the position of the lower end of the vertical wall portion 31 every time the electromagnetic on-off valve 3 is opened.

The time during which the electromagnetic on-off valve 3 is open in order to drain water is set to a relatively small value. The width of the plurality of slits 31a (width in the circumferential direction of the vertical wall portion 31) is set so as not to significantly change the pressure difference (so as not to reduce the pressure difference) by limiting the amount of anode off-gas that flows into the second water storage portion 6 through the upper ends of the slits 31a during this set time.

That is, the upper ends of the slits 31a formed in the vertical wall portion 31 are located at a position higher than the water storage level of the first water storage portion 5 (height that matches the upper end of the tubular wall 24). Therefore, when the electromagnetic on-off valve 3 is opened and the pressure in the second water storage portion 6 drops, part of the anode off-gas may flow toward the second water storage portion 6 through the upper ends of the slits 31a, and the pressure difference may decrease. However, the time during which the electromagnetic on-off valve 3 is open is set to a small value, and the width of the slits 31a is set so that the gas flow can be limited.

Now consider a situation where a vehicle is parked in a cold region with power generation of the fuel cell stopped. In this case, if, for example, water remains in the area from the second water storage portion 6 to the drain channel 26, the water may freeze and the water in the second water storage portion 6 may not be able to be drained even if the electromagnetic on-off valve 3 is opened immediately after the fuel cell starts generating electricity. In order to eliminate such a disadvantage, the electromagnetic on-off valve 3 is controlled to open when the vehicle is parked.

By controlling the electromagnetic on-off valve 3 to open when the vehicle is parked, water in the second water storage portion 6 is drained through the drain channel 26 as described above. Due to the pressure difference caused by this drainage, water in the first water storage portion 5 overflows the upper end of the tubular wall 24 and is supplied to the second water storage portion 6, and the water thus supplied is also drained. All of the water in the second water storage portion 6 can thus be drained.

After the electromagnetic on-off valve 3 is controlled to open, a small amount of water remains in the first water storage portion 5 with the water surface lowered to the position of the lower end of the vertical wall portion 31. After the fuel cell stops generating electricity, a small amount of water remaining inside the fuel cell may be drained and flow into the first water storage portion 5 of the gas-liquid separator A. However, since the amount of water remaining in the first water storage portion 5 is very small, the water flowing into the first water storage portion 5 will be stored in the first water storage portion 5. A disadvantage that the water flows into the second water storage portion 6 can thus be eliminated.

When the fuel cell starts generating electricity and water is newly supplied from the gas-liquid separation portion 4 to the first water storage portion 5 in a situation where a small amount of water remaining in the first water storage portion 5 is frozen, the water flows into the clearance T through the slits 31a rather than through the clearance G. When the water is then stored on the surface of the frozen water and the water surface rises to the upper end of the tubular wall 24, this water overflows the upper end of the tubular wall 24 and is supplied to the second water storage portion 6.

Functions and Effects of Embodiment

As described above, the gas-liquid separator A is structured that includes: the first water storage portion 5 that directly receives water from the gas-liquid separation portion 4; the tubular wall 24 that causes the water from the first water storage portion 5 to flow so as to overflow the tubular wall 24; the second water storage portion 6 that receives the water having overflowed the tubular wall 24; and the lid-like member 30 that causes the overflow of the water due to the pressure difference between the first water storage portion 5 and the second water storage portion 6. The gas-liquid separator A can thus drain all the water in the second water storage portion 6 and drain most of the water in the first water storage portion 5 by merely opening the electromagnetic on-off valve 3.

This structure does not require, for example, a heater for thawing the water in the second water storage portion 6. Therefore, the structure is simple, and energy consumption can be reduced.

In this structure, when the fuel cell is started and water is newly supplied from the gas-liquid separation portion 4 in a situation where water remaining in the first water storage portion 5 is frozen, the water newly supplied to the first water storage portion 5 can be caused to pass through the slits 31a and overflow the upper end of the tubular wall 24 so as to be supplied to the second water storage portion 6. Therefore, there is no need for, for example, a heater etc. in order to thaw the water in the second water storage portion 6. Accordingly, the configuration is simple, and energy consumption can be reduced.

Moreover, since the plurality of rib bodies 27 is formed on the outer surface of the tubular wall 24, water can be caused to evenly overflow along the entire circumference between the outer wall surface of the upper region 24a of the tubular wall 24 and the inner wall surface of the vertical wall portion 31. The position of the lid-like member 30 in the vertical direction can also be determined by the drain guide ribs 28 for guiding the overflowed water.

Other Embodiments

The present disclosure may be structured as follows in addition to the above embodiment (components having the same functions as those of the embodiment are denoted by the same numerals or signs as those of the embodiment).

(a) Instead of the slits 31a formed in the vertical wall portion 31, a through hole is formed at a position higher than the upper end of the tubular wall 24 as viewed from the side. By forming the through hole in this manner, when water is supplied from the gas-liquid separation portion 4 in a state where water in the first water storage portion 5 freezes, the water supplied to the first water storage portion 5 can be caused to flow into the clearance T through the through hole and overflow the upper end of the tubular wall 24 so as to be supplied to the second water storage portion 6.

When forming a through hole in this manner, the opening area of the through hole (sum of the opening areas when forming a plurality of through holes) is set so that the pressure difference large enough for water in the first water storage portion 5 to overflow the upper end of the tubular wall 24 is generated when the pressure in the second water storage portion 6 drops as the electromagnetic on-off valve 3 is opened and the second water storage portion 6 is drained.

(b) Although the rib bodies 27 are formed on the outer periphery of the tubular wall 24 in the embodiment, the rib bodies 27 are formed on the inner periphery of the vertical wall portion 31 of the lid-like member 30. Even with the structure in which the rib bodies 27 are formed in this manner, the clearance T can be provided in the radial direction between the outer wall surface of the upper region 24a of the tubular wall 24 and the inner wall surface of the vertical wall portion 31.

(c) A plurality of protrusions extending downward from the vertical wall portion 31 is formed integrally with the vertical wall portion 31 in order to provide the clearance G between the lower end of the vertical wall portion 31 and the tilted wall 23. Even with this structure, water can be caused to flow into the clearance G when water in the first water storage portion 5 is supplied to the second water storage portion 6 due to the negative pressure.

INDUSTRIAL APPLICABILITY

The present disclosure is applicable to gas-liquid separators.

DESCRIPTION OF THE REFERENCE NUMERALS

3 Electromagnetic On-Off Valve (Valve Mechanism)
4 Gas-Liquid Separation Portion
5 First Water Storage Portion
6 Second Water Storage Portion
24 Tubular Wall
26 Drain Channel
27 Rib Body
28 Drain Guide Rib
30 Lid-Like Member
31 Vertical Wall Portion
31a Slit
32 Lid-Like Portion
35 Filter
H Housing

The invention claimed is:

1. A gas-liquid separator, comprising:
a housing to which water-containing gas is supplied;
collision walls located in an upper part of the housing and that separate water from the water-containing gas;
a first water storage portion that is located in a lower part of the housing and that receives and stores the water separated by the gas-liquid separation portion, the first water storage portion having an annular shape as viewed in plan;
a second water storage portion that is located below the first water storage portion in a bottom part of the housing, and to which the water from the first water storage portion is supplied;
a valve mechanism that allows the water stored in the second water storage portion to be drained and to stop being drained by opening and closing a drain channel communicating with a bottom part of the second water storage portion;
a tubular wall including
an upper wall whose outer circumferential surface defines an inner annular side of the first water storage portion, the upper wall storing the water in the first water storage portion until the water overflows, and guides the overflowed water into the second water storage portion, and a lower wall extending downward from the upper wall, the lower wall including an inner circumferential surface that defines an outer annular side of the second water storage portion; and a lid that covers an upper side of the tubular wall, wherein the outer annular side of the second water storage portion is radially inside and below the inner annular side of the first water storage portion, wherein the lid includes a vertical wall portion separated from the tubular wall, and wherein a plurality of rib bodies that causes water to flow from the first water storage portion to the second water storage portion between the tubular wall and the vertical wall portion is located on either or both of an outer wall surface of the tubular wall and an inner wall surface of the vertical wall portion.

2. The gas-liquid separator according to claim 1, wherein the vertical wall portion of the lid is fitted outside the tubular wall, and the vertical wall portion has a slit extending from a lower end of the vertical wall portion to a position above an upper end of the tubular wall as viewed from side with the vertical wall portion fitted outside the tubular wall.

3. The gas-liquid separator according to claim 1, wherein a drain guide rib that guides the water having overflowed the upper wall of the tubular wall into the second water storage portion is located on an inner periphery of the lower wall of the tubular wall.

4. The gas-liquid separator according to claim 1, wherein the lid includes, between the collision walls and the first water storage portion, a filter that removes dust contained in the water separated by the collision walls.

* * * * *